Oct. 27, 1959     P. SCHLUMBOHM     2,909,909
APPARATUS FOR EVAPORATING A LIQUID UNDER REDUCED PRESSURE
Filed July 14, 1954
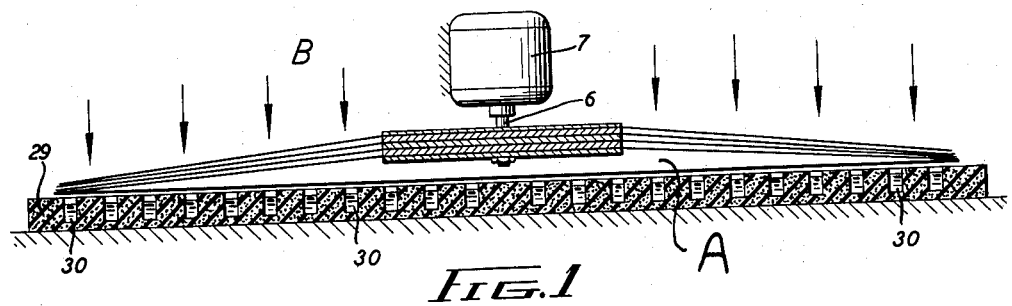
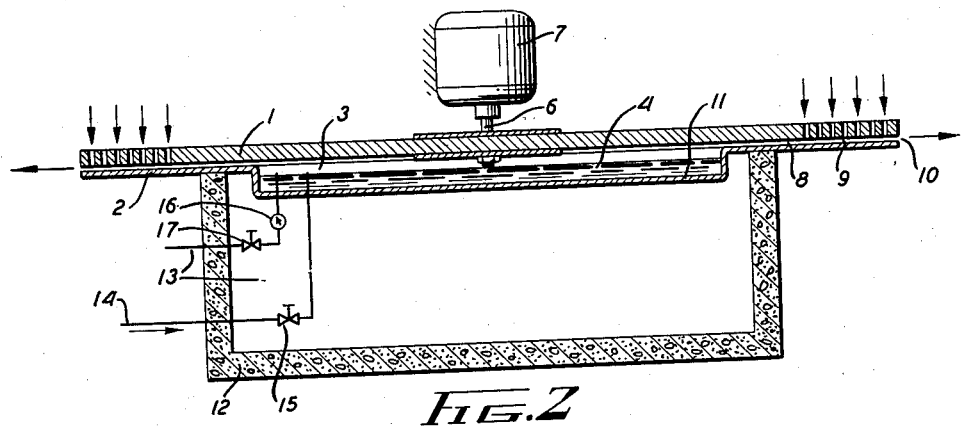
INVENTOR.

United States Patent Office 2,909,909
Patented Oct. 27, 1959

2,909,909

APPARATUS FOR EVAPORATING A LIQUID UNDER REDUCED PRESSURE

Peter Schlumbohm, New York, N.Y.

Application July 14, 1954, Serial No. 443,289

2 Claims. (Cl. 62—268)

The present invention refers to an apparatus for evaporating liquids under reduced pressure and pumping away the vapors.

One application of the apparatus will be to evaporate water to produce a refrigeration effect.

Another application of the apparatus will be as a carburetor to produce a mixture of fuel vapors with air.

Another application of the apparatus will be that of humidifying air by mixing air with vapors of water.

The invention is a continuation in part of my invention of a centrifugal Filterfan described in my pending patent applications Serial No. 225,620, now Patent 2,706,016, Serial No. 298,109, now abandoned, and Serial No. 354,786. It also is a further development of the centrifugal fan described in my U.S. Patent No. 2,655,310.

The application of those two centrifugal fans to the present invention is illustrated in Figure 1 to Figure 3 of the accompanying drawings.

Figure 1 illustrates a filterfan rotating near and above a rubber foam plate which has a multitude of recesses filled with water.

Figure 2 illustrates the centrifugal fan of U.S. Patent No. 2,655,310 rotating near and above a copumping wall, a recess of which is filled with water.

In these cases the level of the liquid forms part of the copumping wall.

The new invention is to evaporate a liquid in the zone of reduced pressure created between the centrifugal fan and its copumping wall, and to let the vapor of the liquid diffuse into the gas pumped by the centrifugal fan, and to thereby pump the vapors to the periphery of the rotating disc and into the atmosphere.

In Figure 1 a motor 7 with a downwardly-directed driving shaft 6 drives a centrifugal filterfan formed by porous discs of uninterrupted surface. The discs rotate near the wall 29 which, in this case, is a sheet of foam rubber which has a multiude of recesses 30 which are filled with water. As indicated by the arrows, air passes through the entire surface of the filterfan from the atmospheric pressure zone B. It enters the zone A of reduced pressure, which is between the filterfan and the copumping wall 29. In this zone of reduced pressure, the water in the recesses 30 evaporates more than it would evaporate at atmospheric pressure. Its vapors diffuse in the air which has entered zone A and the mixture is, by inner friction, thrown to the periphery of the filterfan and into zone B of atmospheric pressure.

Having the water arranged in a multitude of such recesses shields the water surface against contact with all air which passes through the filterfan into the zone A. The air above the water in those recsses remains in a way stagnant and works like a pressure-equalizing gas and as an insulator against the inrushing warm air. The result is that the water in the recesses 30 is cooled off.

Figure 2 shows a fan of the type as described in my U.S. Patent No. 2,655,310. The modification shown differs from the fan shown in the patent by limiting the multitude of tubular flow channels passing through the peripheral zone of disc 1. However, the rotating wall 1 of the fan cooperates with the copumping wall 2, as described in that patent. As indicated by the arrows, air flows in a one-way flow through the vertical channels of wall 1 into the space 9 of lower pressure and is then centrifuged towards the periphery of plate 1 and leaves through the 360° nozzle 10. A fluid 4, for instance water, is held in a recess 3 of the copumping wall 2. The vapors of the fluid 4 diffuse, through a diffusion space 8 into the space 9, where they get mixed with the air which is on its way to outlet 10.

Figure 2 illustrates how the apparatus can be supplemented. The bottom wall 11 of the recess 3 may form the roof of a space which has side walls and bottom walls 12 of insulating material, and the wall 11 may thus be a cold wall. A supply line 14, controlled by a valve 15, may feed additional fluid 4 into the recess 3. An air inlet line 13, equipped with a gauge 16 and a valve 17, may let air into the recess 3. With these means a certain liquid level and a desired pressure can be maintained in the recess 3.

Having now described the nature of my invention and given examples of the manner in which it may be performed,

I claim as my invention:

1. Apparatus for evaporating water as refrigerant, characterized by a water-filled evaporating pan, having a horizontal, plane flange section all around the edge of the pan; further characterized by an impeller disc mounted on a downwardly directed driving shaft concentrically over said pan; the diameter of the disc being larger than the diameter of the pan and extending into the flange section; the distance between the disc and the flange being so small that the flange becomes a co-pumping wall for the rotating disc to form together with it a friction pump which centrifuges vapors of water and air towards the periphery of the disc, thereby allowing fresh evaporation of water in the pan.

2. Apparatus as claimed in claim 1, including means to maintain a high water level in the evaporating pan, whereby the surface of the body of water will be in close proximity to the center zone of the rotating impeller disc to act as co-pumping wall.

References Cited in the file of this patent

UNITED STATES PATENTS

| 1,488,356 | Linke | Mar. 25, 1924 |
| 2,315,052 | Ericson | Mar. 30, 1943 |
| 2,321,907 | Gent | June 15, 1943 |
| 2,342,469 | Holm-Hansen | Feb. 22, 1944 |
| 2,397,230 | Armathes | Mar. 26, 1946 |
| 2,417,010 | Mobley | Mar. 4, 1947 |
| 2,632,598 | Wales | Mar. 24, 1953 |
| 2,655,310 | Schlumbohm | Oct. 13, 1953 |
| 2,706,016 | Schlumbohm | Apr. 19, 1955 |

FOREIGN PATENTS

| 940,569 | France | May 31, 1948 |